United States Patent [19]

Borba

[11] Patent Number: 4,885,991

[45] Date of Patent: Dec. 12, 1989

[54] DEVICE FOR SENSING MALFUNCTION OF TYING APPARATUS ON HAY BALER

[76] Inventor: Frank X. Borba, 14856 Road 200, Porterville, Calif. 93257

[21] Appl. No.: 223,655

[22] Filed: Jul. 25, 1988

[51] Int. Cl.$^4$ .......................... B30B 15/00; B65B 13/18
[52] U.S. Cl. ............................................ 100/99; 100/4; 100/43; 289/2; 289/18.1
[58] Field of Search ................. 100/4, 43, 99; 200/61.18; 242/57; 289/2, 18.1; 56/341, 343

[56] References Cited

U.S. PATENT DOCUMENTS

| | | | |
|---|---|---|---|
| 3,044,052 | 7/1962 | Marsh | 200/61.18 X |
| 4,196,661 | 4/1980 | Yatcilla et al. | 100/99 X |
| 4,269,116 | 5/1981 | Gordon et al. | 100/99 |
| 4,624,179 | 11/1986 | Drutel et al. | 100/99 X |
| 4,674,403 | 6/1987 | Bryant et al. | 100/4 |
| 4,753,464 | 6/1988 | Jackson | 289/2 |
| 4,765,235 | 8/1988 | Schrag et al. | 100/99 X |

FOREIGN PATENT DOCUMENTS 883877  11/1981  U.S.S.R. ................................. 100/4

*Primary Examiner*—Harvey C. Hornsby
*Assistant Examiner*—Stephen F. Gerrity
*Attorney, Agent, or Firm*—Dennis B. Haase

[57] ABSTRACT

In a hay baler, or the like, of the type which compresses loose product into bales which are moved along a controlled path to be tied with a binding such as twine. A device for sensing malfunction of the tying apparatus and signaling that malfunction to the operator, or alternatively, automatically shutting down the baler in response to the signal in which each sensing element comprises a series of bridge like members, each one of which is disposed in a longitudinal path down stream of the knotter devices in the direction of flow of the bales, and which are tied to the knotter devices by linkage which transmits motion of the knotter device to the sensing elements. Each sensing element is rotatably mounted to the baler frame and will move in response to movement generated by a malfunction in the corresponding knotter device. The movement of any sensing element trips a signal or shut down, at the operator's option. Since the knotters operate independent of one another, the sensing elements, likewise, operate independent of one another. A tie bar is provided, however, which is rotatably mounted to the frame and is disposed transverse to the sensing elements, resting on a foot thereof in a preadjusted position with respect to each. Thus, when any knotter device experiences a malfunction, the motion transmitted to the sensing element will cause the rigid bar to raise, resulting in a tripping of the signal device.

7 Claims, 2 Drawing Sheets

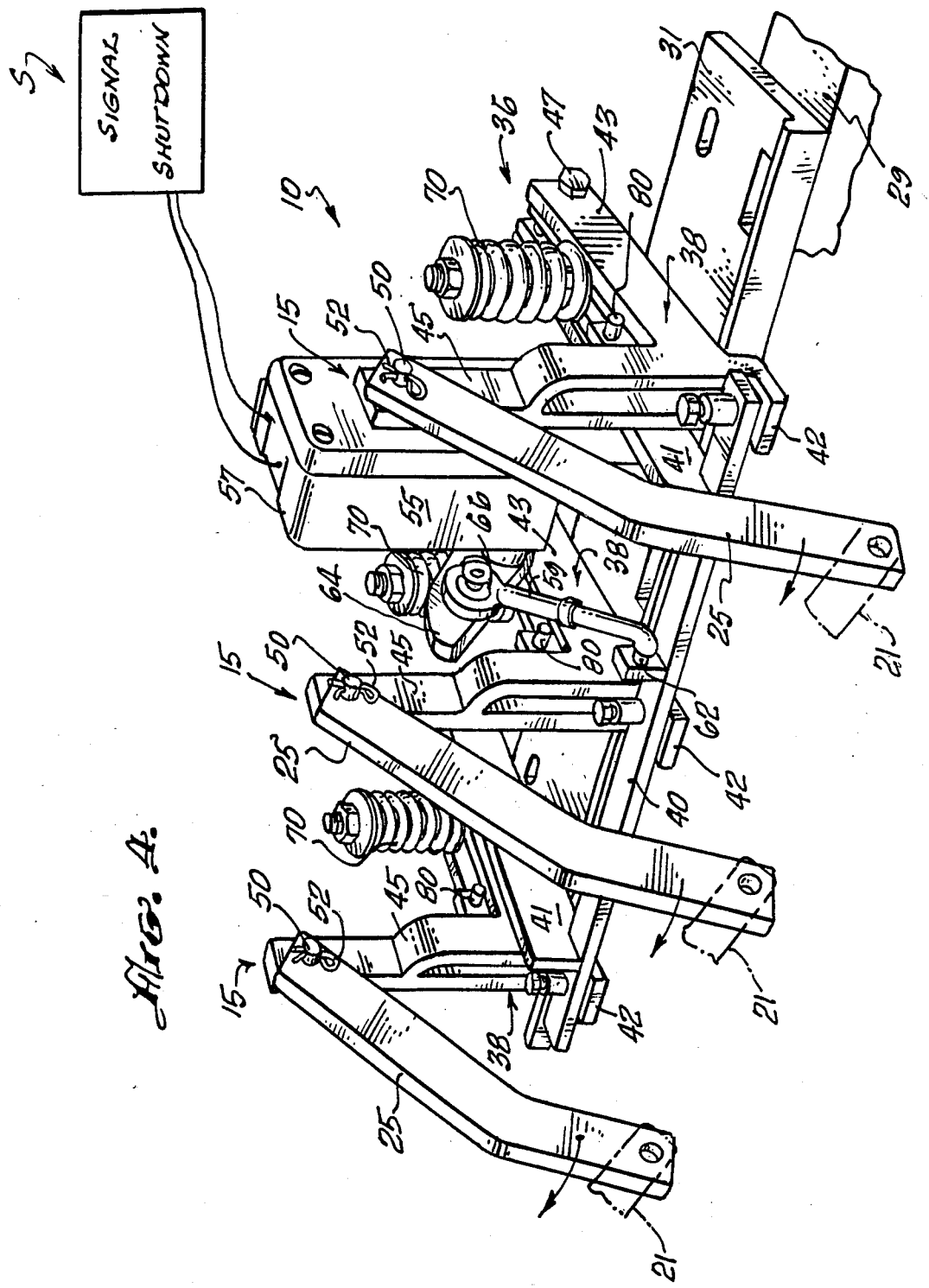

DEVICE FOR SENSING MALFUNCTION OF TYING APPARATUS ON HAY BALER

The following application relates to a novel device for detecting malfunctions in binder tying devices used to tie bales of hay, straw and other products processed through a baling device.

BACKGROUND OF THE INVENTION

1. Field of the Invention

The present invention relates to hay balers in particular, although other, related, applications may be apparent in light of the following description.

There has been a significant evolution in the processing of hay and straw since the very early use of dump rakes, hay loaders pulled behind wagons and the like. In order to store hay and straw more efficiently, methods were devised for compressing the hay into bales of uniform size, tying the bales in their compressed state in order to hold them, thereby permitting their efficient storage and handling for later use. Early hay balers (and it will be understood that the use of the term "hay" is intended to be inclusive of straw and other products which may be baled and tied, with the possible exception of cotton) required several men to operate. The baler, whether pulled by a tractor or self-propelled, moved along a windrow of products such as hay, picked up the windrow, compressed it and forced the compressed material into a chute of predetermined size. One man rode the baler upstream of the chute and would, periodically, insert wooden blocks into the shute to separate the bales. Wire, rather than twine, was used for tying purposes, and two men riding on either side of the shute would insert wires on one side and tie off bales on the other. The operation was labor intensive, obviously costly, and relatively inefficient.

As the evolution continued, first with early mechanical wire tying devices and later with twine, the baling operation was reduced from a five or six man operation to a one man operation. However, due to variations in uniformity, quality, diameter and other characteristics of the binding medium, together with the just plain complexity of the knot tying devices, malfunction of the tying device was not uncommon. Such malfunctions would include jamming of the knotting devices, failure of the knotting device to effect an adequate tie, breakage of the twine itself and an assortment of other maladies, many of which would be undetectable to the operator until he had proceeded for some distance. As a result, bales would be ejected from the baler either loose, or in such infirm condition that handling would result in breakage, all of which would result in loss of time and reduce the efficiency of the entire operation.

2. Overview of Related Art

The fallibility of twine tying devices is not a new revelation, and has been the bane of the baling industry since the inception of the adoption of the mechanical tying device. While several inventors have sought out the solution, the problem is ever present, and until the advent of Applicant's invention, inadequately addressed.

Baling devices come in several configurations, but the most familiar include the large cylindrical bales represented by the baler of Drutel U.S. Pat. No. 4,624,179 and, of course, the bale having the square or rectangular cross section such as that depicted in Gordon, et al. U.S. Pat. No. 4,269,116.

The Gordon patent in recognition of the problem of potential malfunction of the tying device, uses a rather complicated sensing needle, timer and alarm for warning an operator in the event that a tie has not been adequately completed. The device does not, however, provide any kind of warning to the operator until there is already a malfunction in the tying device and a tie has not been adequately completed. Accordingly, the operator does not have any warning until one or more "loose" bales have been generated.

Yatcilla, et al. U.S. Pat. No. 4,196,661 describes yet another effort to provide notice to the operator of a malfunction, but, once again, the device relies wholly upon broken twine as the trigger for the warning. If, for example, the twine broke but became entangled in the mechanism, or did not break but, likewise, did not effect a tie, the warning mechanism would not be triggered and the purpose of the device would be defeated. Moreover, in more modern balers where there is a single operator, typically located forward of the twine tying mechanism by a considerable extent, whether in a self-propelled or tractor pulled device, the raising of a flag, as suggested by Yatcilla, may or may not provide warning to an operator. In all probability, it would not be where the operator is facing forward and concentrating on keeping the baler on the windrow.

SUMMARY OF THE PRESENT INVENTION

The present invention, unlike its predecessors, provides a very simple mechanical apparatus for detecting a malfunction in the tying device as it occurs, as distinguished from those which detect the existence of a problem after one or more loose bales have been created. Thus, the present invention detects the problem before it becomes too serious, and it detects the problem at the knotter, and not down stream on a bale which is already defectively tied. The present invention permits one-man operation, but by the same token, it does not require that one man to be constantly alert for a signal from behind him, since it provides warning and/or shutdown at the operator's station. Unlike highly complicated electronic devices such as in Bryant U.S. Pat. No. 4,674,403, the present device remains compatible with its environment, which is dry, extremely dusty and potentially volatile.

In particular, the present invention recognizes that malfunctions in typical knotting or tying devices, whether a jam or some other malfunction, causes a resistance to rotation of the device, which resistance produces a counter reaction to the power input. The present invention senses the counter reaction, and when the forces reach a point where it is reasonably certain that a problem is imminent, it either produces a signal or causes a shutdown of the apparatus, whichever is deemed most appropriate by the user.

DESCRIPTION OF THE DRAWINGS

Figure 1:
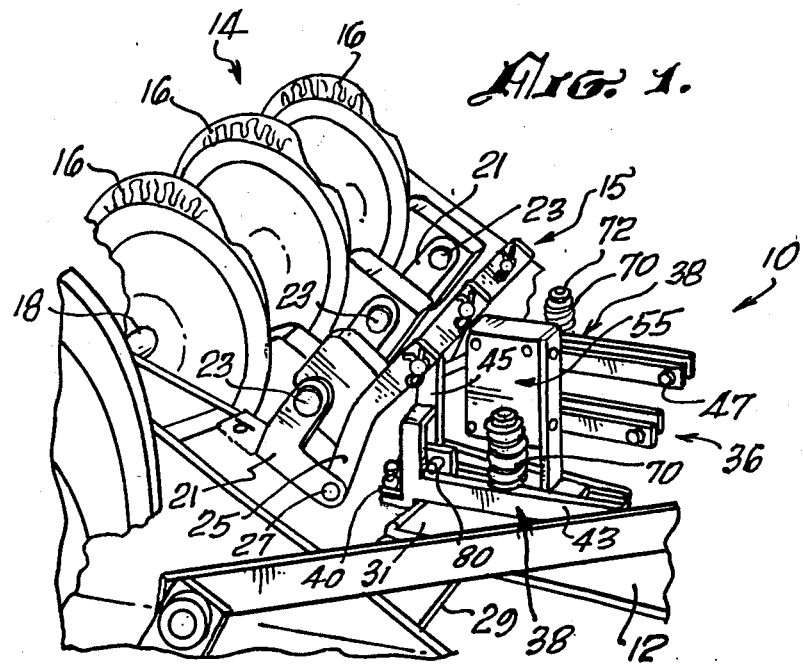
Figure 2:
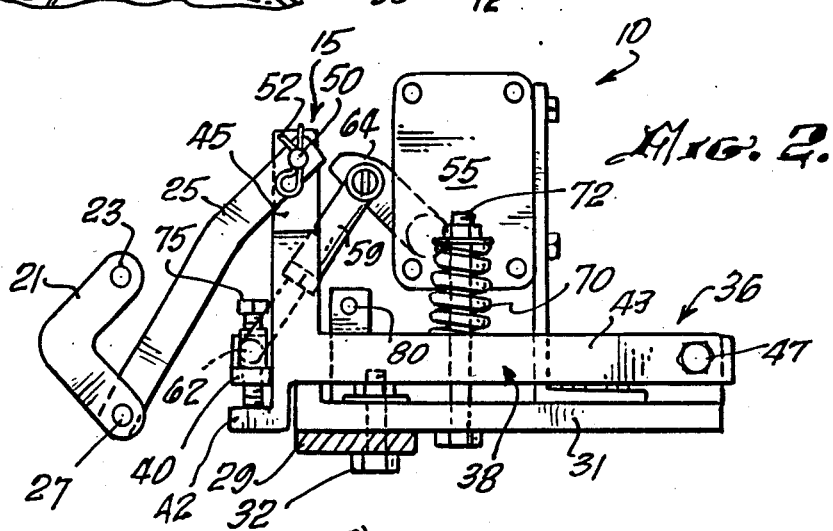
Figure 3:
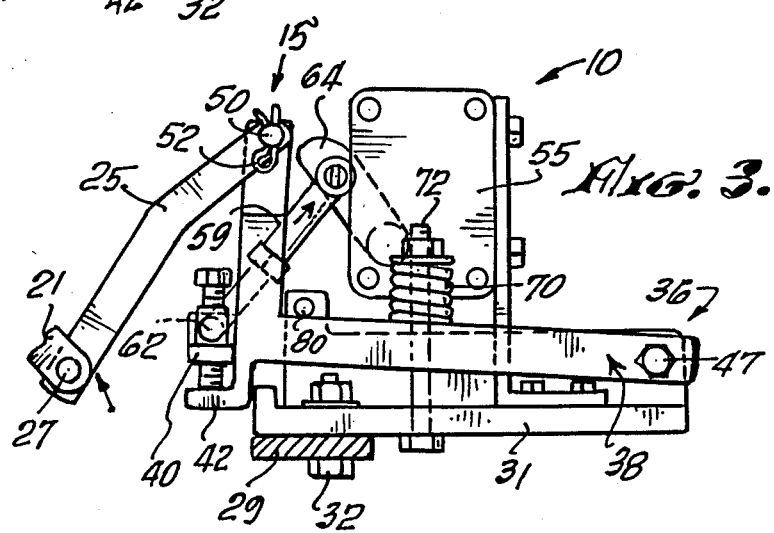

Having thus described the environment in which the present invention has its particular, although not exclusive, use, several novel aspects of the present invention are illustrated in one or more of the figures of the drawings, wherein:

FIG. 1 is a pictorial view of the environment in which the present invention functions, illustrating three knotter mechanisms of a tying device, in parallel, and interconnected with the device of the present invention;

FIG. 2 is a side elevation of the device of the present invention illustrated in its unactuated condition during normal operation of the tying devices;

FIG. 3 is a side elevation of the present invention illustrating its position, once activated by a malfunction of the tying device; and FIG. 4 is a perspective of the present invention illustrating several of its features in greater detail.

DESCRIPTION OF A PREFERRED EMBODIMENT OF THE PRESENT INVENTION

First with reference to FIG. 4, the sensing device of the present invention is illustrated in considerable detail. Its environment is best seen in FIG. 1 wherein the sensing apparatus 10 is shown mounted to the frame 12 of a baler immediately down stream of the tying apparatus 14. The sensing apparatus comprises, in this instance, a plurality of sensing elements 15.

The tying apparatus is of known construction and includes one or more rotating knotter wheels 16. In the present instance, three such wheels are mounted on a single drive shaft 18 in spaced parallel relation. In a typical application, twine is fed into a series of gears on and about the knotter wheels and, during normal operation, nothing more than normal frictional resistance to rotation of the mechanism is experienced. The tying mechanism is so disposed on the baler and mounted with respect thereto, that when inordinate resistance is experienced to the operation of the mechanism, forces are produced which tend to urge the tying mechanism, in a counterclockwise direction, (as illustrated) about the drive shaft 18. It is the presence of this resistive force, resulting from a malfunction, which is exploited by the present invention, as will be hereinafter set forth in greater detail.

FIG. 2 is illustrative of the present invention in its relaxed or nonactuated position. Such is the position of the device of the present invention under normal operation of the tying device. As seen in FIG. 2, an "L" link 21 is secured to the tying device by a fastener 23, thereby interconnecting the tying device and the apparatus of the present invention by a transmission link 25 which connects to the "L" link at one end by means of a fastener 27.

With reference now to FIG. 4, the novel sensing device 10 of the present invention is mounted on a frame cross member 29 by means of a base plate 31, which is conveniently secured to the cross member by means of a fastener 32 (best seen in FIG. 2).

As previously indicated, the warning device of the present invention exploits the presence of resistive forces resulting from a malfunction of the tying device. Recognizing that the tying device as illustrated will display a tendency towards counterclockwise movement upon malfunction, this tendency is exploited, in accordance with one aspect of the invention, by a sensing element 15, each of which comprises a rotatable bridge member 36 composed of a series of "L"-shaped members 38.

With reference now to FIG. 4, the baler employing the mechanism of the present invention is of a type having three knotters, although the principles related herein are applicable to machines having two or more knotters.

Each "L"-shaped member 38 comprises a horizontal, clevis-shaped leg portion 43 formed integrally with a vertical "H"-shaped leg 45. The horizontal leg 43 is essentially parallel in its normal operating position, with the base member 31 and at a remote end thereof is rotatably secured to the base plate 31 by means of a fastener 47. Thus, it will be seen that the movable bridge 36 is capable of limited rotation in a clockwise direction relative to the base plate 31 about the fastener 47. FIGS. 2 and 3 are illustrative of this definitive movement.

Sensing a malfunction may occur on any one of several knotters, or combination of knotters, another feature of this invention is the provision of means whereby a malfunction at any position is readily sensed and signalled to a single signaling device. This is accomplished by means of the use of a transverse, rigid tie bar 40 which, as best seen in FIG. 4, extends at 90° to the flow of the bale and is disposed in mating engagement with each of the sensing elements 15. The bar is mounted to the sensing apparatus by means of legs 41 and rests on a platform or foot 42, defined by the extension of the bridge member 36. The legs 41 are attached by, and are relatively rotatable about, fastener 47 such that any forces acting on one or more of the sensing elements 15 will cause the foot 42 of that sensing element to push the bar 40 upwardly. It will be understood that the bar is sufficiently rigid that upward pressure at any position will result in the bar moving uniformly upward along its entire length, about the fastener 47.

In order to permit sensing of the resistive forces of the tying device during malfunction, the end of the link 25 remote from the end secured to the "L" link 21 is fastened to the upper remote end of the H-shaped leg 45 by means of a pin 50, which is held in place by a cotter key 52. Accordingly, any movement of the tying mechanism in a counterclockwise direction will be transmitted directly to the bridge 36, causing rotation thereof relative to the base plate 31 in a clockwise direction about the fastening device 47.

Having thus provided the means for transmission of motion from the tying apparatus 14 to the sensing device 10, another aspect of the invention now contemplates the provision of either a signal to the operator or a shutdown of the baler, whichever is most appropriate to the purposes of the user. To this end, a switch 55 is provided in a suitable enclosure 57 which will protect it from dust and other adverse environmental elements. In keeping with the objective of the invention to keep the sensing device 10 as mechanically sound and simple as possible, an adjustable tie rod 59 is provided which interconnects the tie member 40 of the movable bridge 36 at 62 to a switch actuator 64. The connection between the switch actuator 64 and the tie rod 59 includes a flexible coupling 66 which is movable within a race to permit transmission of motion of the tie member 40 to the switch lever 64 even though there may be some misalignment.

The switch, which may be either mechanical or electrical, is adapted to transmit a signal by any suitable known means to the location of the operator where it may serve as a signal device, either audibly or visually, or both, or it may be used to automatically shut down the equipment, thereby warning the operator that there is a malfunction.

As best seen in FIGS. 3 and 4, the invention also contemplates the provision of setable adjustment mean to assure that the switch is not actuated unless and until there is sufficient resistance to indicate a malfunction. The invention further contemplates limiting devices to be used to assure that a surge will not be experienced which would damage or destroy the sensing device 10.

To this end, resistance springs 70 have been provided, which are conveniently located slightly forward of the pivoting fastener 47. An appropriate fastener 42 secures the spring 70 to the base member, with the foot 72 of the spring 70 acting against the upper surface of the horizontal leg 43, as well as permitting adjustment of the spring rate. Thus, the spring provides a predetermined resistance, depending upon the spring rate applied, against which the counterclockwise forces of the tying device must work. It will be seen that the resistance offered by the tying device must overcome the spring before the switch will be tripped.

To a similar extent, the travel of the movable bridge 36 may be preset by a fine adjustment device provided in the tie member 40 immediately beneath the connection between the link 25 and its intersection with the upper portion of the H-shaped leg 45. In the present instance, the adjustment device takes the form of a simple threaded machine screw, although any suitable fine adjustment mechanism will suffice without departure from the invention.

Finally, in order to prevent damage or destruction to the switching device resulting from a surge of counter-rotational forces at the tying apparatus, limit pins 80 are provided, which inhibit rotation of the movable bridge about the pivot fastener 47 to protect the switching mechanism from damage or destruction.

Having thus described a preferred embodiment of the invention, what is claimed is:

1. In a baler having a frame along which there is defined a controlled pathway upon which loose material is compressed into bales and secured with at least two tyable bindings; a plurality of knotter devices disposed contiguous to the pathway, and along an axis transverse thereto, for tying the bindings thereabout as the bales move along the controlled path;
   each knotter device being mounted to said baler so as to provide limited arcuate movement about the axis thereof in response to a malfunction of the said knotter device;
   apparatus removed from, and down stream of, said knotter devices for sensing, and responding to, said malfunction in one of said knotter devices, said apparatus comprising, in combination;
   sensing elements disposed in side by side array in said apparatus, each said sensing elements being aligned with one of said knotter devices, and being movably secured to the baler;
   link means providing a positive interconnection between one of said sensing elements and a corresponding knotter device, whereby arcuate movement of one of said knotter devices when said malfunction occurs is communicated to said sensing element by means of said link means;
   signal means on said baler, said signal means including an actuator engaged with said sensing elements so as to be actuated by movement of the sensing element in response to said malfunction in one of said knotter devices.

2. The sensing apparatus of claim 1, wherein rigid means interconnecting each sensing element such that movement of any of said sensing elements, is transmitted directly to said signal means.

3. The sensing apparatus of claim 1, wherein each sensing element comprises a moveable bridge, said bridge being rotatable about a fastener connected to the frame of the baler, links interconnecting each said bridge and one of said knotter devices, whereby movement of a knotter device in response to said malfunction thereof is transmitted to said bridge, and means responsive to movement of said bridge for signaling said malfunction.

4. The apparatus as set forth in claim 3, wherein said signaling means is a machine shutoff device for stopping operation of the baler in response to said malfunction of a knotter device.

5. The apparatus of claim 3, wherein each said bridge is formed with a foot protruding therefrom at an end opposite its point of connection to said fastener;
   means defining a rigid bar disposed transverse to said bridges so as to rest on each said foot, said rigid bar being connected to and rotable about said fastener, said signal means being connected to said rigid bar whereby movement of any said bridge is transmitted through said rigid bar to said signal means.

6. The apparatus set forth in claim 5, wherein means is provided on said rigid bar for initial fine adjustment position of each said bridge related to said rigid bar.

7. The apparatus set forth in claim 5, wherein said signal operates a shutoff device for stopping operation of the baler in response to said malfunction of a knotter device.

* * * * *